(12) United States Patent
D'anastasi

(10) Patent No.: US 9,764,755 B2
(45) Date of Patent: Sep. 19, 2017

(54) ROCKER ASSEMBLY FOR SETTLING A CHILD

(71) Applicant: MR LJD ENTERPRISES PTY LTD, Aitkenvale (AU)

(72) Inventor: Maryanne D'anastasi, Townsville (AU)

(73) Assignee: MR. LJD ENTERPRISES PTY LTD, Aitkenvale (AU)

( * ) Notice: Subject to any disclaimer, the term of this patent is extended or adjusted under 35 U.S.C. 154(b) by 193 days.

(21) Appl. No.: 14/772,070

(22) PCT Filed: Aug. 9, 2013

(86) PCT No.: PCT/AU2013/000882
§ 371 (c)(1),
(2) Date: Sep. 1, 2015

(87) PCT Pub. No.: WO2014/022895
PCT Pub. Date: Feb. 13, 2014

(65) Prior Publication Data
US 2016/0016602 A1    Jan. 21, 2016

(30) Foreign Application Priority Data
Aug. 10, 2012    (AU) ................ 2012101217

(51) Int. Cl.
*B62B 9/00*    (2006.01)
*B62B 9/22*    (2006.01)
(Continued)

(52) U.S. Cl.
CPC ............ *B62B 9/22* (2013.01); *A47D 13/105* (2013.01); *B60N 2/2842* (2013.01);
(Continued)

(58) Field of Classification Search
CPC .......... B62B 9/22; B62B 7/142; B62B 7/145; B60N 2/2842; B60N 2/2845; B60N 2/2848; A47D 13/105
See application file for complete search history.

(56) References Cited

U.S. PATENT DOCUMENTS 720,410 A * 2/1903 Drubech ............. A47D 9/02
                                                        5/103
1,727,635 A * 9/1929 Crane ................. A47D 9/02
                                                        310/34
(Continued)

FOREIGN PATENT DOCUMENTS

CN    1428119 A    7/2003
CN    1515212 A    7/2004
(Continued)

OTHER PUBLICATIONS

International Search Report with written opinion for corresponding application, dated Oct. 4, 2013.

*Primary Examiner* — Beth Stephan
(74) *Attorney, Agent, or Firm* — Stein IP, LLC

(57) ABSTRACT

A rocker assembly for settling a child, the assembly including a base, an upper platform attached to the base by a mounting assembly, the mounting assembly including at least one linking arm pivotally attached to both the base and the upper platform to space the upper platform from the base and to limit the movement of the upper platform relative to the base, wherein the upper platform is connected to a rotating drive via a connecting arm and the connecting arm is attached circumferentially relative to the rotating drive such that rotation of the rotating drive is translated into an at least partially reciprocating movement of the upper platform.

19 Claims, 8 Drawing Sheets

(51) Int. Cl.
*B62B 7/14* (2006.01)
*B60N 2/28* (2006.01)
*A47D 13/10* (2006.01)

(52) U.S. Cl.
CPC ......... *B60N 2/2845* (2013.01); *B60N 2/2848* (2013.01); *B62B 7/142* (2013.01); *B62B 7/145* (2013.01)

(56) References Cited

U.S. PATENT DOCUMENTS

| | | | | |
|---|---|---|---|---|
| 1,733,115 A * | 10/1929 | Capito | A47D 9/02 | 5/109 |
| 1,952,700 A * | 3/1934 | Zielinski | B62B 9/185 | 188/20 |
| 2,520,563 A * | 8/1950 | Preston | A47D 9/02 | 297/260.2 |
| 2,644,958 A * | 7/1953 | Davis | A47D 9/02 | 5/109 |
| 2,708,585 A * | 5/1955 | Garnes | B62B 9/22 | 267/5 |
| 2,941,526 A * | 6/1960 | Mott | A61H 1/0292 | 200/33 R |
| 2,979,735 A * | 4/1961 | Helmer | A47D 9/02 | 5/105 |
| 3,031,687 A * | 5/1962 | Stevens | A47D 9/02 | 5/109 |
| 3,261,032 A * | 7/1966 | Reardon | A47D 9/02 | 5/108 |
| 3,378,859 A * | 4/1968 | Paraque | A47D 9/02 | 5/109 |
| 3,802,003 A * | 4/1974 | Laureti | A47D 9/02 | 5/108 |
| 3,992,731 A * | 11/1976 | Carswell | A47D 9/02 | 5/108 |
| 4,258,446 A * | 3/1981 | McAllister | A47D 9/02 | 5/105 |
| 4,419,777 A * | 12/1983 | Parker | A47D 9/02 | 5/108 |
| 4,483,327 A * | 11/1984 | Graham | A61H 1/001 | 5/109 |
| 4,490,867 A * | 1/1985 | Gabrielsson | A47C 21/006 | 5/109 |
| 4,586,492 A * | 5/1986 | Manahan | A61H 1/003 | 5/109 |
| 4,590,631 A * | 5/1986 | Varney | A47D 9/02 | 5/101 |
| 4,881,285 A * | 11/1989 | Zeeb | A47D 9/02 | 5/103 |
| 4,970,740 A * | 11/1990 | Crawford | A47D 9/02 | 5/103 |
| 5,183,457 A * | 2/1993 | Gatts | A61G 7/065 | 128/897 |
| 5,301,661 A * | 4/1994 | Lloyd | A47C 21/006 | 601/100 |
| 5,303,433 A * | 4/1994 | Jang | A47D 9/04 | 5/109 |
| 5,404,603 A * | 4/1995 | Fukai | A61G 7/001 | 5/609 |
| 5,520,614 A * | 5/1996 | McNamara | A61H 1/003 | 601/24 |
| 6,155,976 A * | 12/2000 | Sackner | A47C 21/006 | 5/600 |
| 6,250,654 B1 * | 6/2001 | Willis | B62B 9/22 | 280/30 |
| 6,682,495 B2 * | 1/2004 | Park | A47C 21/006 | 601/101 |
| 7,281,284 B2 * | 10/2007 | Sims, Jr. | A47C 21/006 | 5/108 |
| 7,485,086 B2 * | 2/2009 | Dickie | A47D 9/02 | 600/28 |
| 7,788,744 B2 * | 9/2010 | Calilung | A47D 9/02 | 5/101 |
| 7,971,885 B2 * | 7/2011 | Sanders | B62B 9/22 | 180/166 |
| 2003/0098562 A1 * | 5/2003 | Lerner | B62B 9/185 | 280/47.41 |
| 2013/0334781 A1 * | 12/2013 | Mills | A63G 9/02 | 280/47.41 |

FOREIGN PATENT DOCUMENTS

| | | | | |
|---|---|---|---|---|
| CN | 201243839 Y | | 8/2008 | |
| FR | 1501951 A | * | 11/1967 | ............... A47D 9/04 |
| FR | 2659926 A1 | | 9/1991 | |

* cited by examiner

ROCKER ASSEMBLY FOR SETTLING A CHILD

TECHNICAL FIELD

The present invention relates generally to a device for settling a baby or child and particularly to a device that can be used with existing baby or child seats or capsules or the like to settle a child in a hands free configuration.

BACKGROUND ART

It is well known in the art that children, particularly babies and children are more easily settled using a rhythmic motion such as that illustrated in FIG. 1 using a pram or similar device. This is a particular problem for parents, particularly new mothers, who tend to prioritize settling the baby over all other activities. Therefore, it is a problem that parents, particularly new mothers deal with by settling the baby and ignoring or ceasing all other activity while settling the baby or child.

This can lead to the parents sacrificing or foregoing other activity while the baby requires settling which can lead to feelings of depression and/or resentment towards the child.

It will be clearly understood that, if a prior art publication is referred to herein, this reference does not constitute an admission that the publication forms part of the common general knowledge in the art in Australia or in any other country.

SUMMARY OF INVENTION

The present invention is directed to a rocker assembly for settling a child, which may at least partially overcome at least one of the abovementioned disadvantages or provide the consumer with a useful or commercial choice.

With the foregoing in view, the present invention in one form, resides broadly in a rocker assembly for settling a child, the rocker assembly including a base, an upper platform attached to the base by a mounting assembly, the mounting assembly including at least one linking arm pivotally attached to both the base and the upper platform to space the upper platform from the base and to limit the movement of the upper platform relative to the base, wherein the upper platform is connected to a rotating drive via a connecting arm and the connecting arm is attached circumferentially relative to the rotating drive such that rotation of the rotating drive is translated into an at least partially reciprocating movement of the upper platform.

In another form, the invention may reside in a rocker assembly for settling a child, the rocker assembly including a base, an upper platform attached to the base by a mounting assembly, the mounting assembly including at least one linking arm pivotally attached to both the base and the upper platform to space the upper platform from the base and to limit the movement of the upper platform relative to the base, wherein the upper platform is connected to a drive via a connecting arm and the connecting arm is attached relative to the drive such that the upper platform is movable by the drive in a manner which mimics a movement of a parent of the child.

In use, the rocker assembly of the preferred embodiment will be used to settle a child but also preferably to assist with putting a child to sleep, stopping a child crying or assisting with a misbehaving child. The rocker assembly of the present invention will typically be used with a seat or capsule or cradle or other device into which a child, particularly a younger child or baby can be placed in order to free the parent or minder from having to hold the child or to move the seat or capsule or cradle or other device in order to settle a child. Therefore, the rocker assembly of the present invention is particularly adapted to simulate the motion of rocking the child to settle them but free the parent or minder. It is particularly preferred that the rocker assembly of the present invention be used in a hands-free or remote control configuration.

The rocker assembly of the present invention may be provided as a rocker module to which a seat or capsule or cradle or other device into which a child can be placed, can be attached or engage and which is itself attachable to a variety of different movable or fixed module supports.

The particular configuration of the module support can vary and will typically include a pram stroller frame for example or alternatively, a platform module support which can support the rocker module relative to a substantially planar surface.

The pram or stroller frame configuration preferably allows movement or transport of the child as normal but once the pram is not moving, the preferred rocker assembly incorporated into the pram or stroller frame continues the soothing, reciprocating movement to simulate actual movement of the pram or stroller.

The platform module support embodiment generally has a planar base for location onto a support surface such as the ground, a table or bench or the like and to which the rocker module can be attached, with a capsule or similar attached, such that the capsule or similar can be moved by the rocker assembly.

The preferred rocker assembly is adapted to move the upper platform at least partially longitudinally relative to the base. Typically, this means movement in a direction parallel lengthways to the general head/feet orientation of the child rather than a side to side motion. Of course, more complex, multidirectional movements may be incorporated using the same general features, but if provided, these movements will typically be in the same plane rather than any large up-and-down movements.

Research suggests that in order to me most effective, the motion of the upper platform should mimic the gait of the parent of the child. The aspects of the gait would therefore change between parents or the same child and between parents of different children. The drive may therefore utilise other motions for example simple harmonic motion, linear motion in either or both directions, circular motions at the front and rear, offset motions in which the upper platform may move change in any one or more of the pitch, roll or yaw directions more or less randomly or coherent motions in which the upper platform may move change in any one or more of the pitch, roll or yaw directions in an ordered pattern, a pendulum motion or the like which mimics a movement of a parent of the child to soothe the child.

According to a preferred embodiment, the rocker assembly may be provided with a control apparatus that can adjust the movement of the upper platform either in speed or direction or both.

According to the most preferred embodiment, the rocker assembly will typically be provided in a rocker module which will normally be provided with an aesthetically pleasing housing.

The rocker assembly may be provided by an original equipment manufacturer at the manufacturing stage or alternatively, it can be provided as an assembly which can be retrofit aftermarket.

The rocker assembly of the present invention includes a base. The base is typically a lower portion of the rocker assembly which is typically fixed in or relative to the housing of the rocker module in order to provide a fixed reference relative to which the upper platform is moved.

Normally, the rotation drive is provided in association with the base. The rotation drive typically includes a motor of some sort, preferably a DC electric motor with a rotating output. This will typically be the simplest type of motor which can be provided and of course, more complex or powerful motors with different motions may be provided if desired. Typically, a drive member is attached to the rotating output.

The drive member is typically circular in shape. The drive member preferably rotates about an axis of rotation which is preferably substantially perpendicular to the plane of the base and/or the upper platform and/or the directional movement of the upper platform. Therefore, the plane of rotation of the drive member is preferably substantially parallel to the direction of movement of the platform.

Typically, the base of the rocker assembly of the preferred embodiment is hollow with components such as the rotation drive and/or motor provided within. Preferably, the base defines a containment volume into which the rotation drive and/or motor is received. The preferred drive member can be located outside the containment volume but preferably is located inside the containment volume in order to limit moving parts outside the volume which may pose safety concerns or issues.

Typically, an upper side of the base is substantially planar, whether the upper side comprises a wall extending transversely or simply the free ends of one or more upstanding walls which define the containment volume.

The rocker assembly of the present invention includes an upper platform attached to the base by a mounting assembly. The upper platform is preferably substantially similar in size to the base in order to allow easy containment within the housing of the preferred rocker module. The purpose of the upper platform is to mount or attach the child support whether it be a seat or capsule or cradle or other device relative thereto so that the movement of the upper platform relative to the base can be transmitted to the seat or capsule or cradle or other device.

In one preferred form, the upper platform can be provided as an open topped tray, particularly for retrofits as this configuration may be adaptable to receive a wider variety of configurations of child seats or capsules or cradles or other devices. According to this embodiment, the upper platform will have an open topped with a cavity defined by at least one, and normally a plurality of sidewalls, upstanding from a periphery of a planar member which is substantially parallel to the base.

The upper platform may have a different configuration if provided in an OEM device. It is preferred however that regardless of which configuration is provided, that the upper platform is substantially rectangular.

The upper platform may be provided with one or more attachment or engagement mechanisms in order to attach or engage the seat or capsule or cradle or other device located relative thereto in order to prevent any relative movement between the upper platform and the seat or capsule or cradle or other device. Any configuration of attachment or engagement mechanism can be provided in order to achieve the purpose.

The rocker assembly of the present invention also includes the mounting assembly including at least one linking arm pivotally attached to both the base and the upper platform to space the upper platform from the base and to limit the movement of the upper platform relative to the base. Typically, a number of linking arms are provided Generally, four linking arms will be preferred, to on either lateral side of the base an upper platform, one forward and one rear linking arm on either lateral side in order to provide a balanced and stable movement of the upper platform relative to the base.

It is preferred that the linking arms provide reciprocal translation of the upper platform relative to the base in the longitudinal direction. As mentioned above, movement in other directions may or may not be allowed or provided for.

Each linking arm is typically an elongate member and is preferably planar. Each linking arm is preferably sized to space the upper member closely from the base. However, the length or size of the linking arm should account for the fact that there will be some movement in the upper platform in an up-and-down direction during the reciprocal translation due to the fixed length of the linking arms but this is preferably optimized to be minimal by changing the length of the stroke of the reciprocal translation and/or the length of the linking arms. This will preferably ensure that there is no bumping or contact of the upper platform with the base, particularly at the ends of the reciprocal translation stroke.

Each linking arm will preferably have two connection points, one on the base and one on the upper platform. Typically, both connection points are pivot connection points.

Preferably, a mount will be provided on each of the upper platform and the base in order to mount the linking arms thereto. In a preferred form, the linking arms are attached to the upper platform and to the base by or through the mount provided on each.

According to a particularly preferred form, each mount is elongate and planar, preferably attached longitudinally to the respective sides of each of the base and upper platform. A particularly preferred form is a plate or strip of material, typically extending between the two connection points for the preferred linking arms. The plate or strip will typically extend along the respective sides of the respective upper platform and base and the pivot points are preferably provided through the strip or plate. According to the most preferred embodiment, four mounts are provided, one on either lateral side of the base and one on either lateral side of the upper platform with the linking arm connection pivot points through either end of the respective mount.

According to the present invention, the upper platform is connected to a rotating drive via a connecting arm and the connecting arm is attached circumferentially relative to the rotating drive such that rotation of the rotating drive is translated into an at least partially reciprocating movement of the upper platform.

Typically, the connecting arm is elongate and has one end connected or attached to the upper platform and the other end connected or attached to or relative to the drive member associated with the rotating drive. The connecting arm may be attached directly to the drive member or indirectly. Where attached indirectly, a pinion arm is preferably used. According to this configuration, the pinion arm extends substantially parallel to the drive member and extends from the centre of the drive member outwardly in a radial direction. The pinion arm is preferably attached relative to the rotating drive member and the connecting arm is attached to the pinion arm, typically at or towards the outer end of the pinion arm.

Preferably, the connecting arm is attached at one of the pivot connections of a linking arm to the upper platform.

Typically, the connecting arm is attached to one of the pivot connections of a linking arm to the base as well. The connecting arm will typically allow translation of the rotating motion of the drive member to a reciprocal motion of the upper platform relative to the base.

As mentioned above, the rocker assembly of the present invention is typically provided in a rocker module. The rocker module typically includes the rocker assembly located within a housing. Typically, the rocker assembly is located in a lower portion of the housing and the housing has a substantially open upper portion. Preferably, the housing will have at least a pair of upstanding side walls in order that the seat or capsule or cradle or other device into which the child is placed can be received between the side walls and associated with the upper platform.

A lower external portion of the housing will preferably be shaped in order to engage with one or more engagement portions allowing connection of the rocker housing with the module support. In one preferred form, the engagement portions can be as simple as shaped tabs which can then be received or otherwise engage with corresponding engagement portions provided on the module support. The module may be releasably lockable relative to the module support.

The housing will also typically include a control device in order to control the movement of the rocker assembly including activation and deactivation and also control of any other devices that may require control that are associated with the module support.

One particular form of module support is a platform module support adapted for use on or in relation to a support surface, but which can also be incorporated into an OEM device such as a pram or stroller in order to allow easy attachment and detachment of the rocker module thereto.

In a preferred form, the platform module support includes a substantially planar support surface on one side of a base. The base also includes a pair of engagement portions, one being a fixed engagement portion and the other being a movable engagement portion. Typically, the rocker module is engaged with the fixed engagement portion and then the rocker module is moved to engage the movable engagement portion which at least temporarily locks the rocker module relative to the module support.

In a preferred form, the fixed engagement portion can be as simple as a shaped structure which includes or defines a convergent opening. Typically, the fixed engagement portion is located at or towards one end of the module support.

Preferably located at or towards the opposite end of the module support is the preferred movable engagement portion. This portion preferably has a shaped structure which includes or defines a convergent opening which faces the fixed engagement portion. The movable engagement portion is preferably mounted with an overcenter or similar action in order to allow engagement and then the overcenter or similar action providing a locking function. One or more levers or the like are preferably associated with the movable engagement portion in order to unlock the movable engagement portion once the rocker module is engaged and locked to the module support.

Further, it is preferred that the activation and deactivation of the rocker assembly be provided by remote control or other similar remote activation and deactivation. There are many methods of accomplishing remote activation and deactivation but perhaps the most convenient in the current climate is to provide a wireless connection between a ubiquitous product such as a mobile telephone or smart phone or tablet PC operating software to activate and deactivate or otherwise control the rocker assembly which communicates these operating instructions to a control device associated with the rocker assembly.

According to a particularly preferred embodiment, the control device provided to control the rocker assembly can be utilized and communication pathways can be provided to allow this control device to control other devices which may be used in association with the preferred rocker assembly or rocker module.

Such devices can include video and/or audio devices for capture, playback or transmitting of video or audio information, and/or inserts in the seat or capsule or cradle or other device into which the child is placed that provide other soothing or therapeutic functionality such as vibration for example, or a timer function for any of the devices or the rocker assembly. Devices may be fitted within the capsule. For example, if speakers are provided, then they may be provided within the pram or capsule adjacent the child's head and preferably, beneath a layer of padding or similar to prevent injury to the child or damage to the speaker.

It is particularly preferred that the drive for the rocker assembly (and any other electronic devices associated with the rocker assembly) be battery operated in order to allow relatively free movement of the rocker assembly and associated devices without limitation as to location of an appropriate power source. Where provided in this form, the batteries can be rechargeable and/or replaceable.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

DESCRIPTION OF EMBODIMENTS

Figure 5:
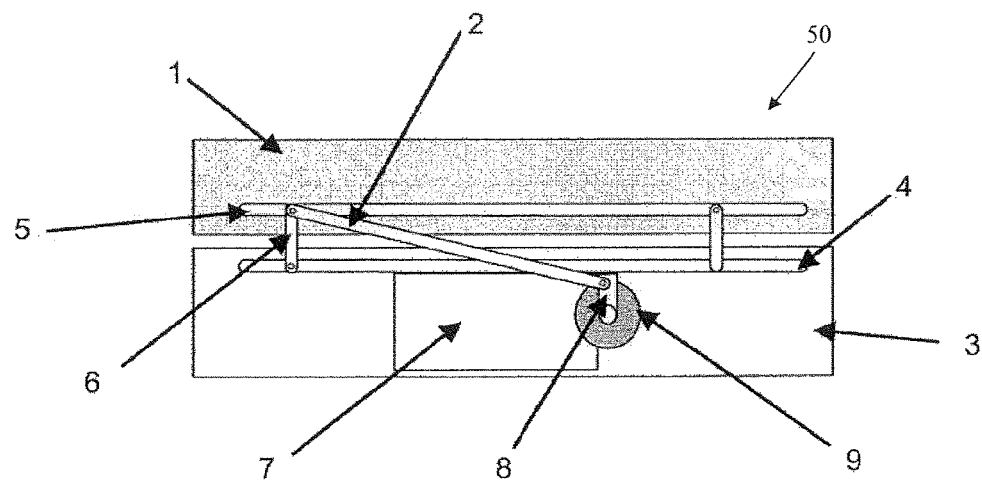
FIG. 5 is a side view of a rocker assembly according to a preferred embodiment of the present invention in the neutral or central position.
Figure 6:
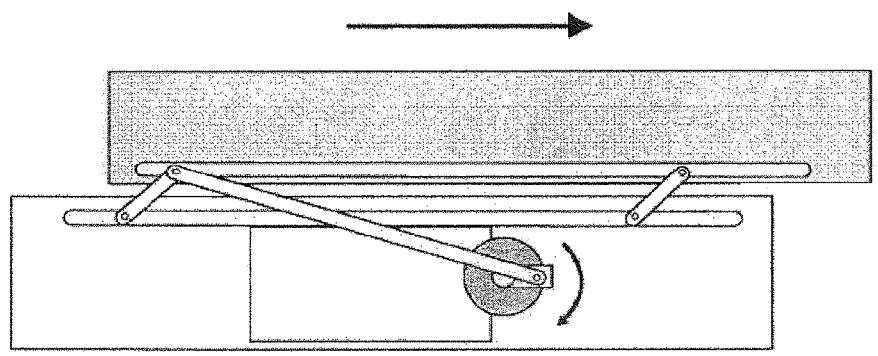
FIG. 6 is a side view of the rocker assembly illustrated in FIG. 5 in the extreme right position.
Figure 7:
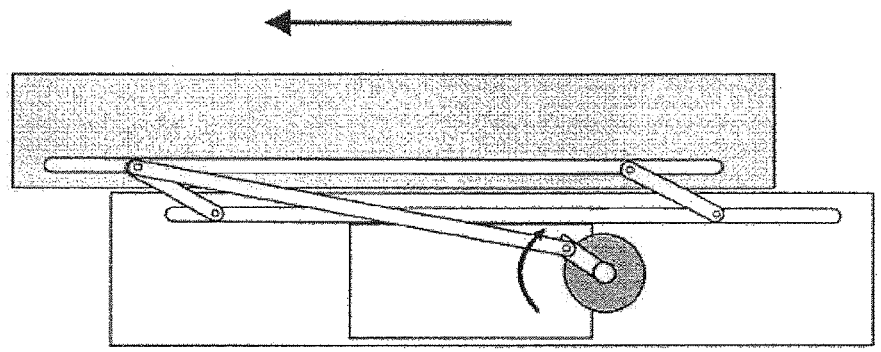
FIG. 7 is a side view of the rocker assembly illustrated in FIG. 5 in the extreme left position.

According to a particularly preferred embodiment of the present invention, a rocker assembly 50 for settling a child is provided, a preferred form of which is illustrated in FIGS. 5 to 7.

The rocker assembly 50 including a base 3, an upper platform 1 attached to the base 3 by a mounting assembly. The mounting assembly includes a number of linking arms 6 pivotally attached to both the base 3 and the upper platform 1 to space the upper platform 1 from the base 3 and to limit the movement of the upper platform 1 relative to the base 3, wherein the upper platform 1 is connected to a rotating drive member 9 via a connecting arm 2 and the connecting arm 2 is attached circumferentially relative to the rotating drive member 9 such that rotation of the rotating drive member 9 is translated into an at least partially reciprocating movement of the upper platform 1.

Figure 1:
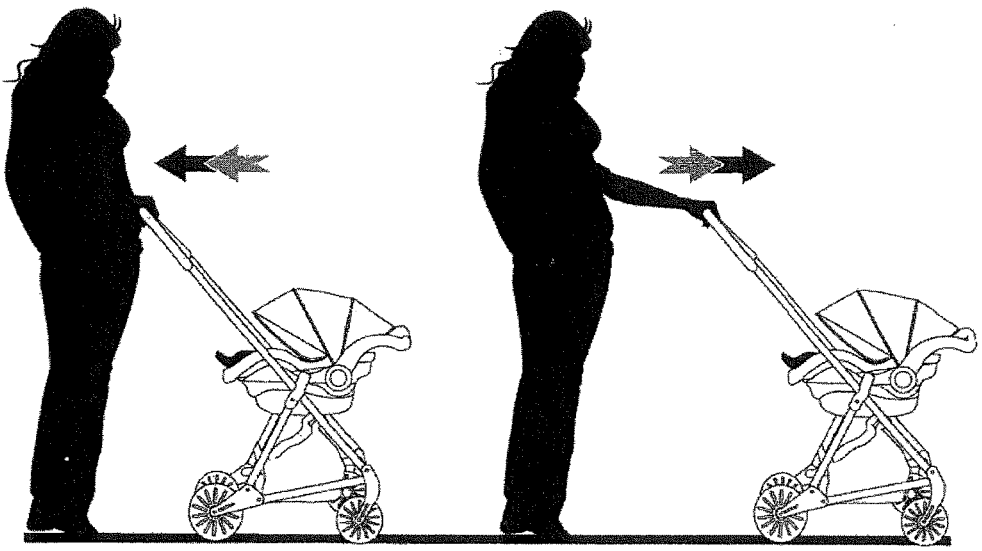
FIG. 1 is a schematic illustration of the reciprocal motion that pushing a pram causes for the child.
Figure 2:
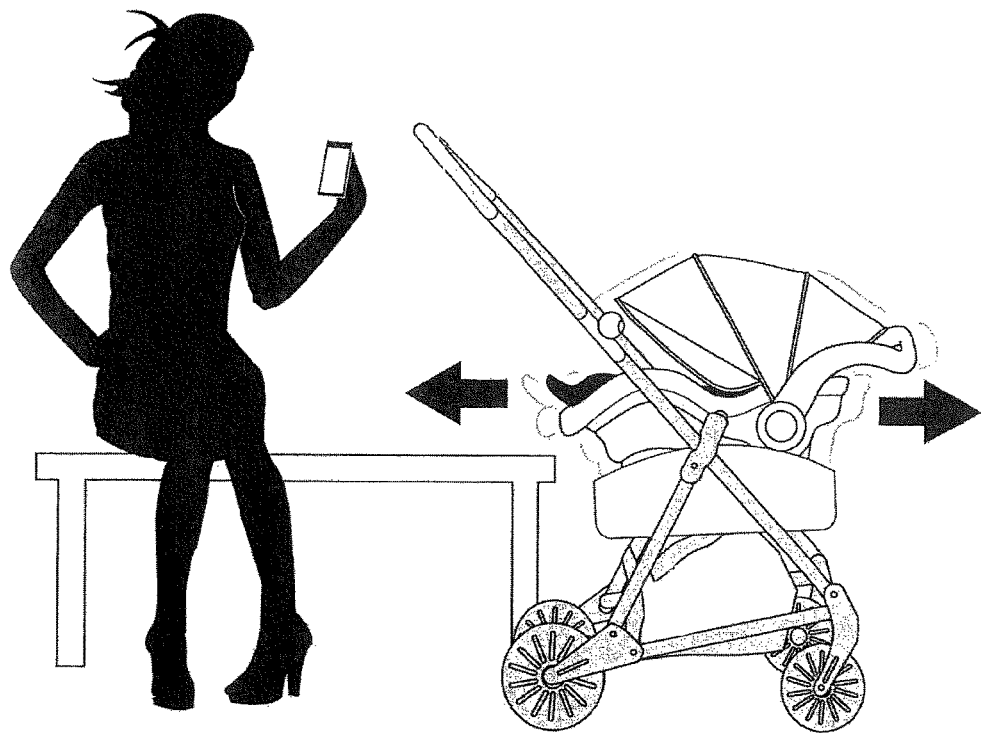
FIG. 2 is a schematic illustration of the operation of the rocker assembly according to a preferred embodiment of the present invention.

In use, the rocker assembly 50 of the preferred embodiment is used to settle a child. The rocker assembly 50 of the present invention will typically be used with a seat or capsule or cradle or other device into which a child, particularly a younger child or baby can be placed in order to free the parent or minder from having to hold the child or to move the seat or capsule or cradle or other device in order to settle a child as illustrated in FIG. 2. Therefore, the rocker assembly 50 of the present invention is particularly adapted to simulate the motion of rocking the child to settle them but free the parent or minder. It is particularly preferred that the rocker assembly 50 of the present invention be used in a hands-free or remote control configuration such as illustrated in FIG. 2.

Figures 3, 3A, 4:
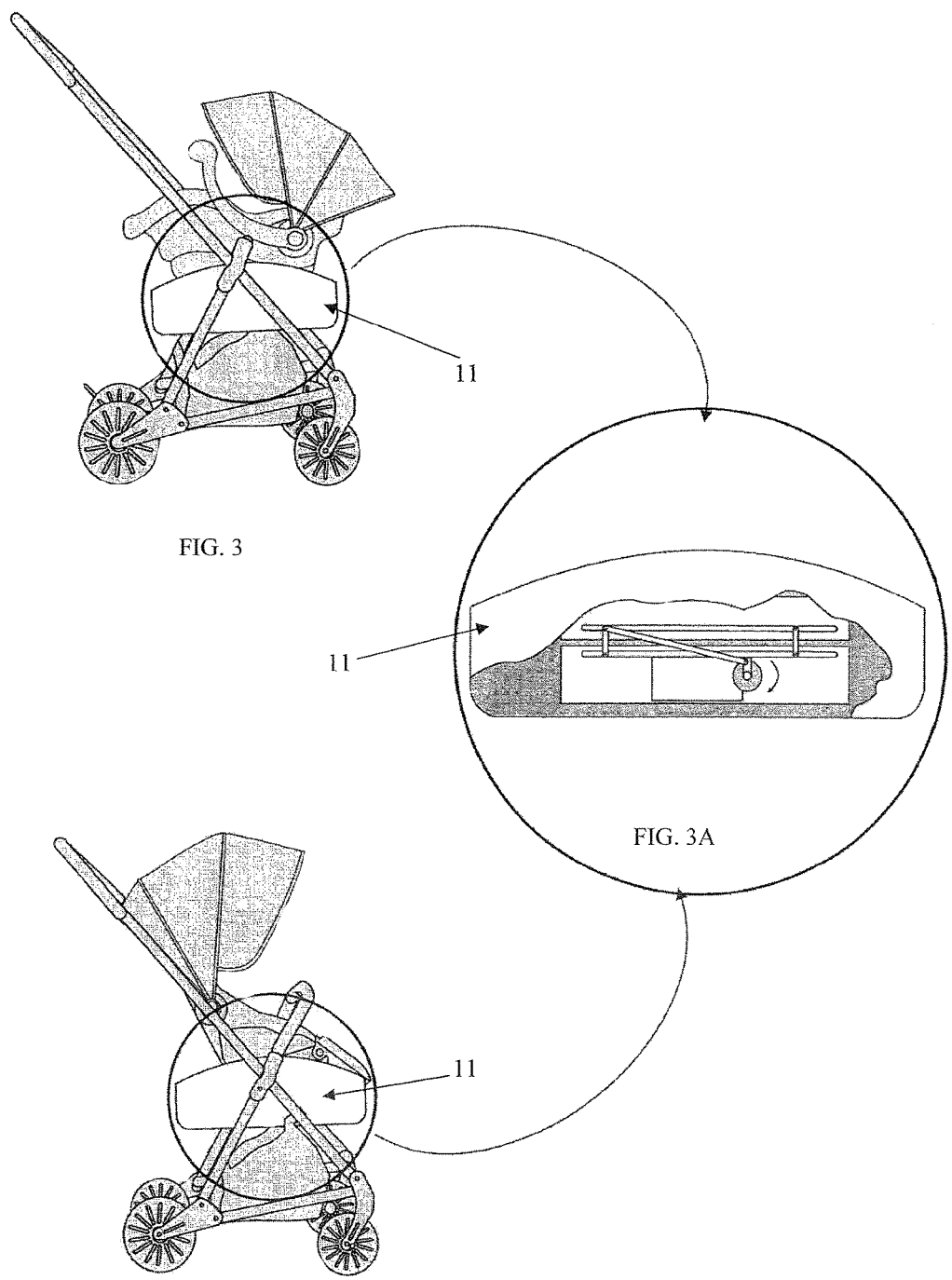
FIG. 3 is a side view of a baby capsule pram configuration of the rocker assembly according to a preferred embodiment of the present invention.
FIG. 3A is a detailed side, partially sectional view showing the internal working of the rocker assembly according to the embodiment illustrated in FIG. 3.
FIG. 4 is a side view of a toddler pro-am configuration of the rocker assembly according to a preferred embodiment of the present invention.

The rocker assembly 50 of the present invention may be provided as a rocker module 11 as illustrated in FIGS. 3, 3A and 4 in particular to which a seat or capsule or cradle or other device into which a child can be placed, can be attached or engage and which is itself attachable to a variety of different removable or fixed module supports.

The particular configuration of the module support illustrated in FIGS. 3, 3A and 4 includes a baby capsule pram or stroller in FIG. 3 and a toddler pram or stroller in FIG. 4, each of which includes the rocker module illustrated in FIG. 3A.

The pram or stroller frame configuration allows movement or transport of the child as normal but once the pram is not moving, the preferred rocker module 11 incorporated into the pram or stroller frame continues the soothing, reciprocating movement to simulate actual movement of the pram or stroller.

Figure 9:
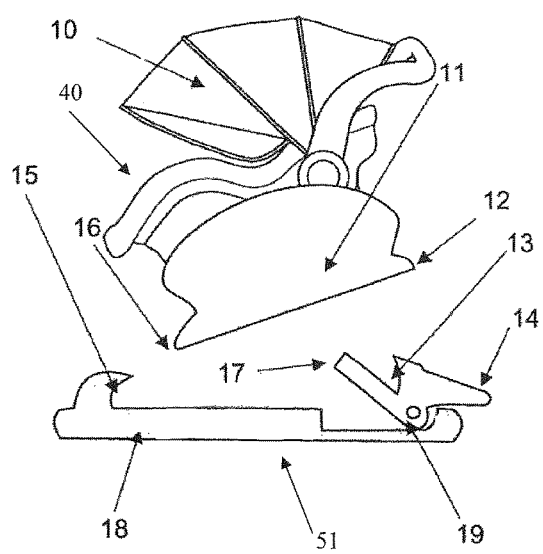
FIG. 9 is an exploded side view of a rocker assembly according to a preferred embodiment of the present invention with an optional freestanding module.
Figure 10:
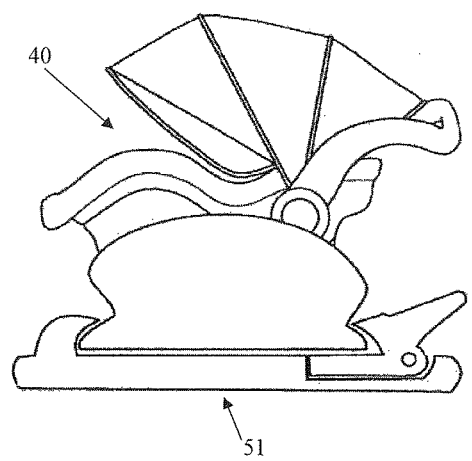
FIG. 10 is a side view of the rocker assembly and freestanding module illustrated in FIG. 9 in the operational condition.

A module support may be provided in a platform module support configuration as illustrated in FIGS. 9 and 10 which can support the rocker module 11 relative to a substantially planar surface. The platform module support illustrated in FIGS. 9 and 10 has a planar base 18 for location on to a support surface such as the ground, a table or bench or the like and to which the rocker module 11 can be attached, with a capsule 40 attached, such that the capsule 40 can be moved by the rocker assembly 50.

The preferred rocker assembly 50 is adapted to move the upper platform 1 longitudinally relative to the base 3. Typically, this means movement in a direction parallel lengthways to the general head/feet orientation of the child rather than a side to side motion.

According to the most preferred embodiment, the rocker assembly 50 is provided in a rocker module 11 which is provided with an aesthetically pleasing housing.

As illustrated in FIG. 5 in particular, the rocker assembly 50 of the preferred embodiment includes a base 3. The base 3 is a lower portion of the rocker assembly 50 which is fixed in or relative to the housing of the rocker module 11 in order to provide a fixed reference relative to which the upper platform 1 is moved.

Normally, the rotation drive member 9 is provided in association with the base 3. The rotation drive 9 is connected to a DC electric motor 7 with a rotating output. The rotation drive member 9 is attached to the rotating output.

The illustrated rotation drive member 9 is circular in shape rotating about an axis of rotation which is substantially perpendicular to the plane of the base 3 and/or the upper platform 1 and/or the directional movement of the upper platform 1, illustrated in FIGS. 6 and 7 by an arrow.

The upper platform 1 is attached to the base 3 by a mounting assembly. The upper platform 1 is preferably substantially similar in size to the base 3 in order to allow easy containment within the housing of the preferred rocker module 11. The purpose of the upper platform 1 is to mount or attach the child support whether it be a seat or capsule or cradle or other device relative thereto so that the movement of the upper platform 1 relative to the base 3 can be translated to the a seat or capsule or cradle or other device.

In one preferred form, the upper platform 1 can be provided as an open topped tray, particularly for retrofits as this configuration may be adaptable to receive a wider variety of configurations of child seats or capsules or cradles or other devices.

The mounting assembly includes a number of linking aims 6 pivotally attached to both the base 3 and the upper platform 1 to space the upper platform 1 from the base 3 and to limit the movement of the upper platform 1 relative to the base 3.

According to the embodiment illustrated in FIGS. 5 to 7, four linking arms 6 ware provided, two on either lateral side of the base 3 and upper platform 1, one forward and one rear linking arm 6 on either lateral side in order to provide a balanced and stable movement of the upper platform 1 relative to the base 3.

Each linking arm 6 is an elongate member and is planar. Each linking arm 6 is sized to space the upper platform 1 closely from the base 3. Each linking arm 6 has two connection points, one on the base 3 and one on the upper platform 1 and both connection points are pivot connection points.

A mount is provided on each of the upper platform 1 and the base 3 in order to mount the linking arms 6 thereto. In the illustrated form, the linking arms 6 are attached to the upper platform 1 and to the base 3 by or through the mount provided on each.

According to a particularly preferred form illustrated, each mount is elongate and planar, attached longitudinally to the respective sides of each of the base 3 and upper platform 1. According to this form, each mount is a plate or strip of material, extending between the two connection points for the linking arms 6. An upper plate or strip mount 5 extends along each side of the upper platform 1 and a lower plate or strip mount 4 extends along each side of the base 3 and the pivot points for the linking arms 6 are provided through the strip or plate.

The upper platform 1 is connected to the rotating drive member 9 via a connecting arm 2 and the connecting arm 2 is attached circumferentially relative to the rotating drive member 9 such that rotation of the rotating drive member 9 is translated into an at least partially reciprocating movement of the upper platform 1.

As illustrated, the connecting arm 2 is elongate and has one end connected or attached to the upper platform 1 and the other end connected or attached to or relative to the rotating drive member 9. The connecting arm 2 is attached indirectly to the rotating drive member 9. According to this configuration, a pinion arm 8 extends substantially parallel to the rotating drive member 9 and extends from the centre of the rotating drive member 9 outwardly in a radial direction. The pinion arm 8 is attached relative to the rotating drive member 9 and the connecting arm 2 is attached to the pinion arm 8, typically at or towards the outer end of the pinion arm 8.

The connecting arm 2 is attached at one of the pivot connections of a linking arm 6 to the upper platform 1. Typically, the connecting arm 2 is attached to one of the pivot connections of a linking arm 6 to the base 3 well. The connecting arm 2 allows translation of the rotating motion of the rotating drive member 9 into a reciprocal motion of the upper platform 1 relative to the base 3.

Figure 8:
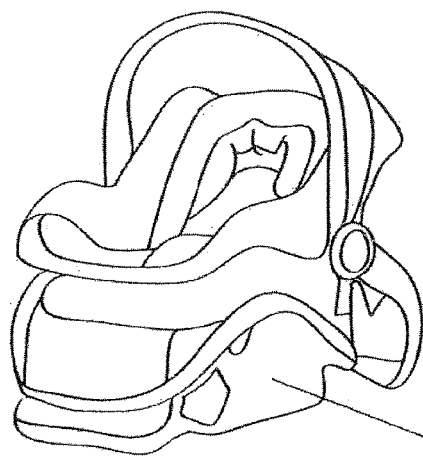
FIG. 8 is an axonometric view of a baby capsule including a rocker assembly according to a preferred embodiment of the present invention.
Figure 8A:
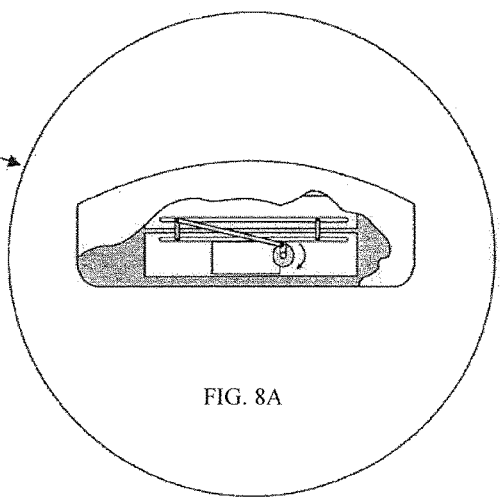
FIG. 8A is a detailed side, partially sectional view showing the internal working of the rocker assembly according to the embodiment illustrated in FIG. 8.

As mentioned above, the rocker assembly 50 of the present invention is typically provided in a rocker module 11. The rocker module 11 typically includes the rocker assembly 50 located within a housing. Typically, the rocker assembly 11 is located in a lower portion of the housing and the housing has a substantially open upper portion. The rocker module 11 with attached or engaged capsule 40 can simply be placed on a surface to provide the reciprocal movement as illustrated in FIG. 8.

Alternatively, a lower external portion of the housing may be appropriately shaped in order to engage with one or more engagement portions allowing connection of the rocker module with a planar module support. In the preferred form illustrated in FIG. 9, the engagement portions are a shaped head locking tab 12 and a shaped tail locking tab 16 which can then be received or otherwise engage with corresponding engagement portions provided on the planar module support.

Figure 11:
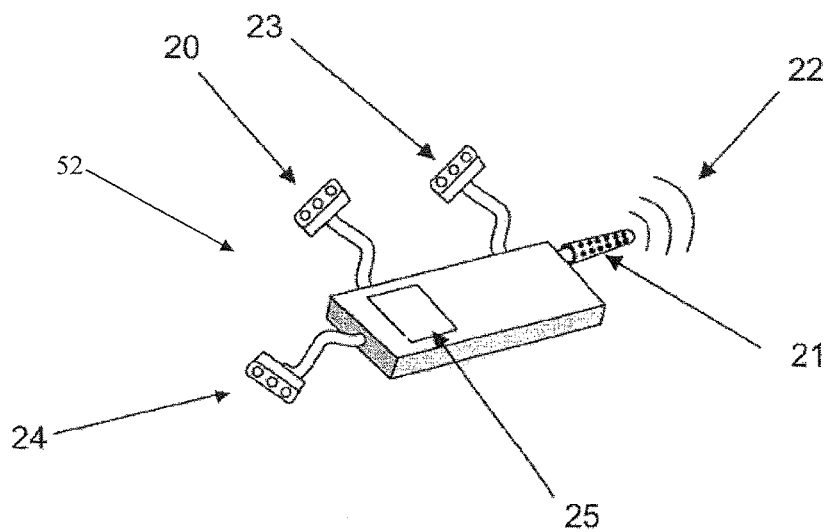
FIG. 11 is a schematic illustration of a main computer module to control the rocker assembly of a preferred embodiment of the present invention.

The housing will also typically include a control device such as that illustrated in FIG. 11, in order to control the movement of the rocker assembly 50 including activation and deactivation and also any other devices that may require control that are associated with the module support.

Figure 16:
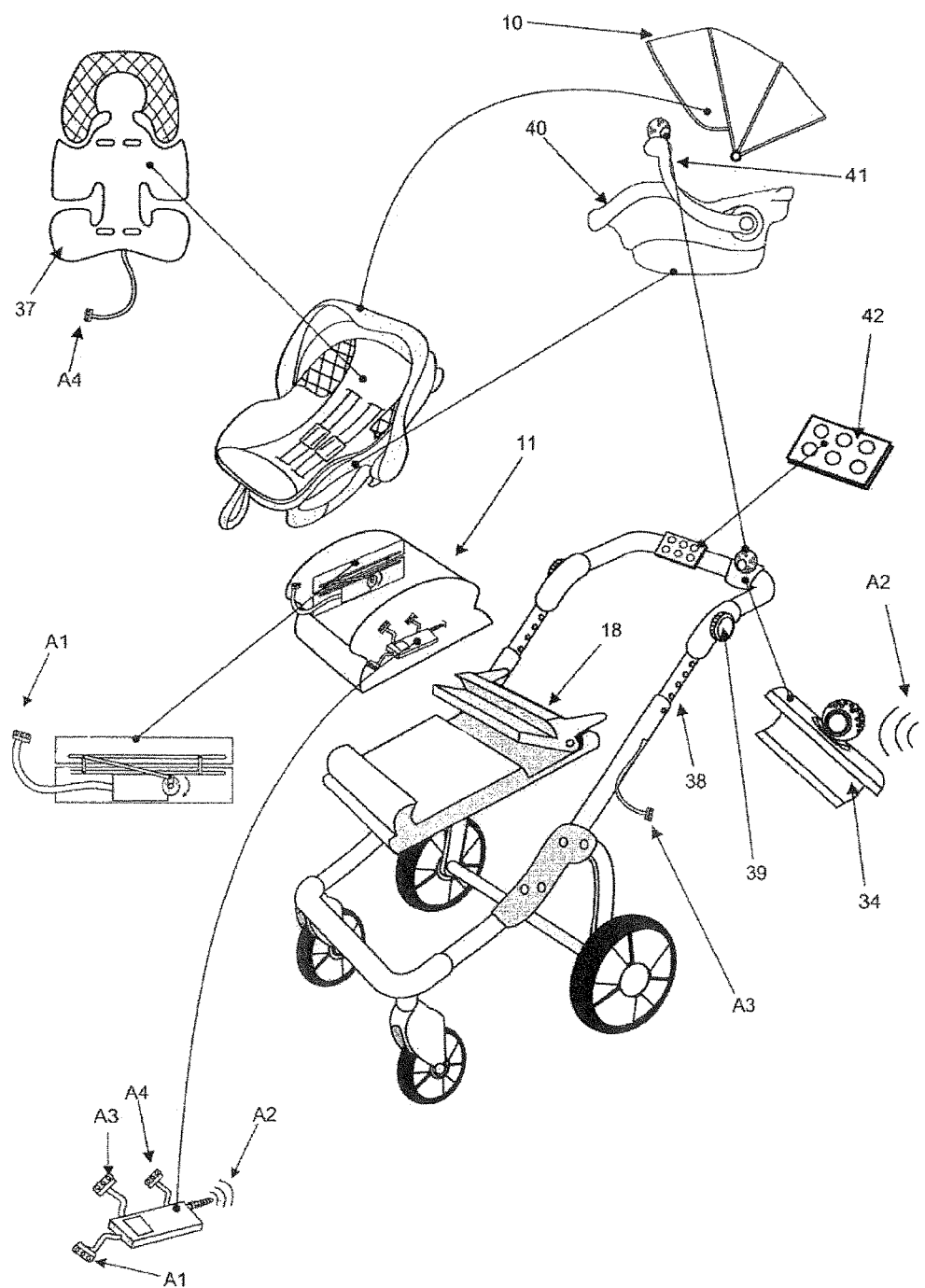
FIG. 16 is a schematic illustration of a variety of components including the rocker assembly of a preferred embodiment which can be used in any baby capsule pram configuration according to a preferred embodiment.
Figure 17:
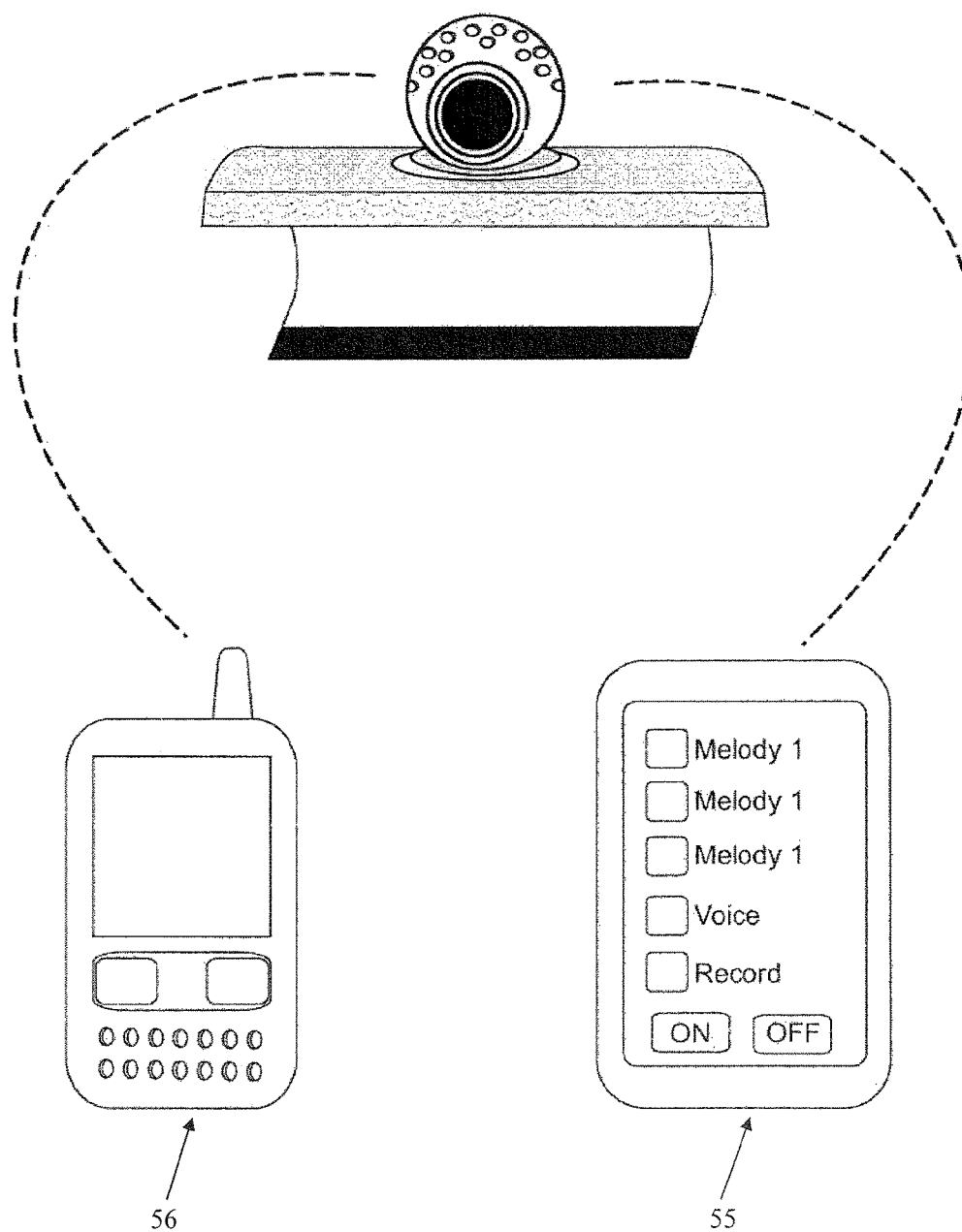
FIG. 17 is a schematic illustration of potential communication pathways between the trackball video/audio device and a baby monitor or mobile telephone according to a preferred embodiment of the present invention.

One particular form of platform module support 51 is illustrated in FIGS. 9 and 10 and is adapted for use on or in relation to a support surface but which can also be incorporated into an OEM device such as a pram or stroller such as is illustrated in FIG. 16 in order to allow easy attachment and detachment of the rocker module 11 thereto.

In the form illustrated in FIGS. 9 and 10, the platform module support 51 includes a substantially planar support surface on one side of a base 18. The base 18 also includes a pair of engagement portions, one being a fixed engagement portion 15 for receiving the tail locking tab 16 of the rocker module 50 and the other being a movable engagement portion. The moveable engagement portion illustrated has a shaped receiving opening 13 for receiving the head locking tab 12 of the rocker module 11 with an ejection arm 17 located below to raise one end of the rocker module 11 during ejection about pivot 19. A release lever 14 is also provided to move the movable engagement portion between the locked and released condition.

In a preferred form, the fixed engagement portion 15 is as simple as a shaped structure which includes or defines a convergent opening. Typically, the fixed engagement portion 15 is located at or towards one end of the platform module support 51.

Located at or towards the opposite end of the module support 51 is the preferred movable engagement portion. This portion preferably has a shaped structure which includes or defines a convergent opening which faces the fixed engagement portion 15. The movable engagement portion is preferably mounted with an overcenter or similar action in order to allow engagement and a locking function.

Typically, the rocker module 11 with associated capsule 40 with canopy 10 is engaged with the fixed engagement portion 15 and then the rocker module 11 is moved to engage in movable engagement portion which at least temporarily locks the rocker module 11 relative to the module support 51.

Further, it is preferred that the activation and deactivation of the rocker assembly be provided by remote control or other similar remote activation and deactivation. There are many methods of accomplishing remote activation and deactivation but perhaps the most convenient in the current climate is to provide a wireless connection between a ubiquitous product such as a mobile telephone, smart phone or tablet PC operating software to activate and deactivate or otherwise control the rocker assembly which communicates these operating instructions to a control device associated with the rocker assembly.

According to a particularly preferred embodiment, the control device 52 provided to control the rocker assembly can be utilized, and communication pathways can be provided, to allow this control device 52 to control other devices which may be used in association with the preferred rocker assembly or rocker module.

Such devices can include video and/or audio devices for capture, playback or transmitting of video or audio information, and/or inserts in the seat or capsule or cradle or other device into which the child is placed that provide other soothing or therapeutic functionality such as vibration for example, or a timer function for any of the devices or the rocker assembly.

According to the preferred embodiments illustrated in FIGS. 11 to 16, a main computer control device 52 illustrated in FIG. 11 is powered by a rechargeable lithium battery 25 and includes programming to start/stop the rocking assembly illustrated in FIG. 5. This main computer control device 52 has a number of connections or communication pathways allowing connection or communication with various electronic devices which are associated with a particularly preferred embodiment of a pram or stroller illustrated in FIG. 16. The connection or communication pathways include connection 20 which connects to the preferred pram wiring harness designated as A3 in FIG. 16 allowing manual activation of the video/audio device illustrated in FIG. 12. Connection or communication pathway 24 attaches to the electric motor wire which controls activation and deactivation of the rocker assembly 50.

Figure 15:
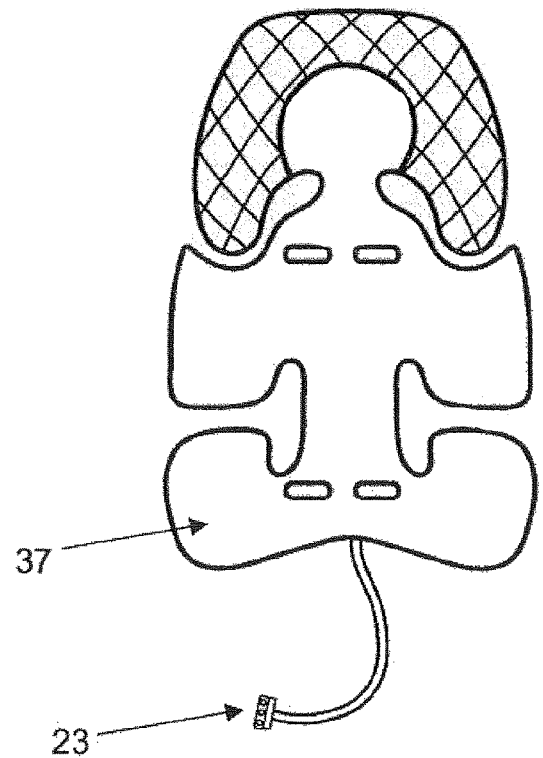
FIG. 15 is a schematic front view of a vibrating backrest according to a preferred embodiment, which may be inserted into the baby capsule illustrated in FIG. 14.

The connection or communication pathways include connection 23 to connect to the vibrating backrest 37 illustrated in FIG. 15 via the appropriate connection provided on the backrest 37 in the form of connection wire 23.

Figure 12:
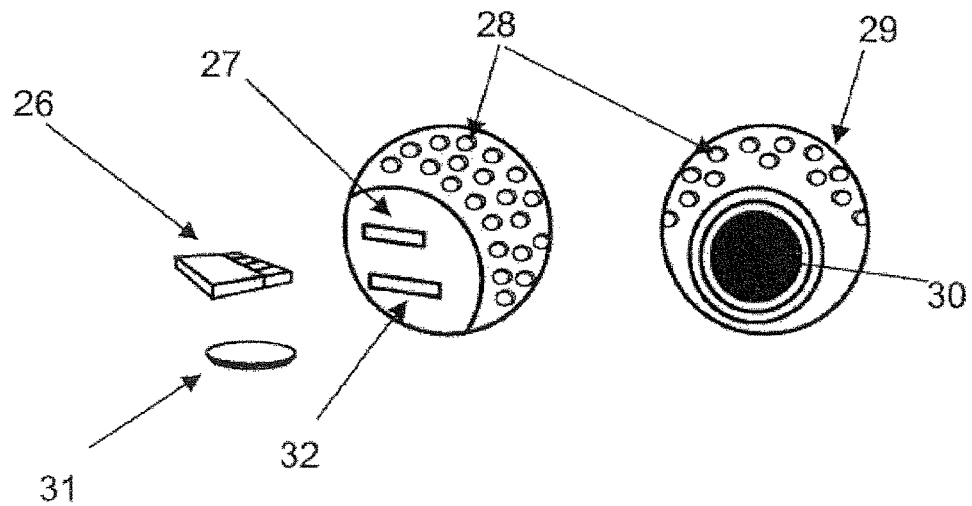
FIG. 12 is a schematic illustration of a trackball video/audio device which can be mounted relative to a baby or child capsule or seat according to a preferred embodiment.

Further, a wireless connection can be formed using antenna 21 and an appropriate signal 22 between the main computer control device 52 and the audio/video device illustrated in FIG. 12.

Figure 13:
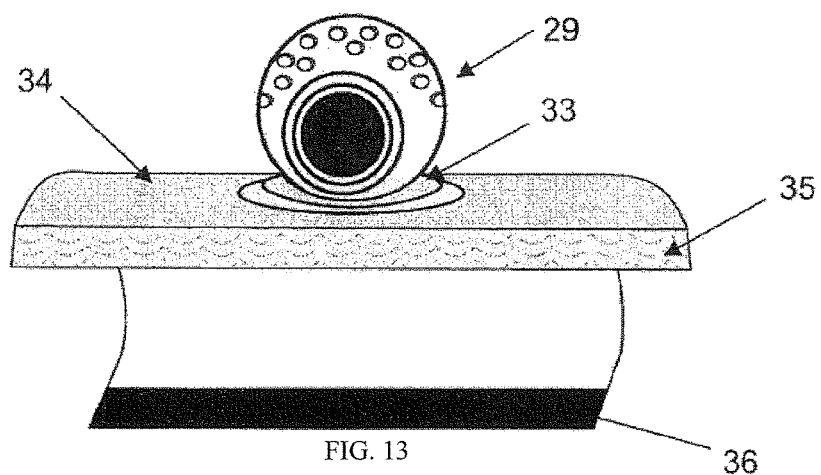
FIG. 13 is a schematic illustration of the trackball video/audio device with an attachment wrap according to a preferred embodiment of the present invention.
Figure 14:
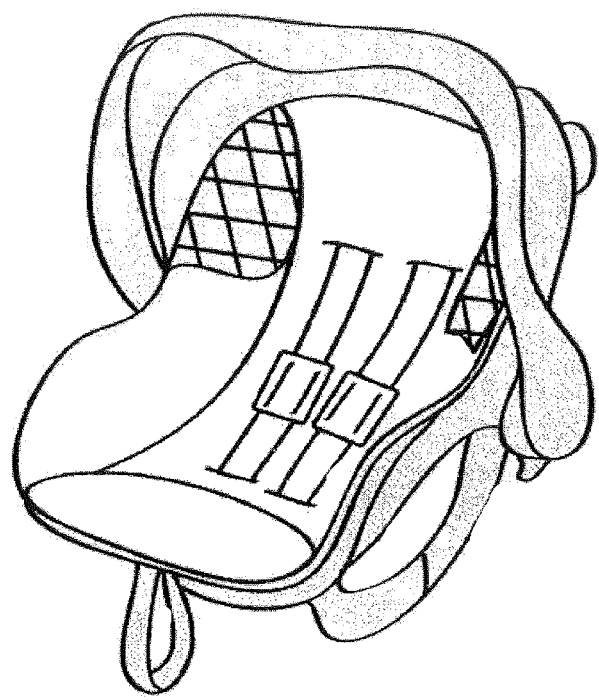
FIG. 14 is an axonometric view of a baby capsule free of the rocker assembly mounting module according to a preferred embodiment of the present invention.

The preferred audio/video device illustrated in FIG. 12 is a trackball 29 preferably mounted as illustrated in FIG. 13. The trackball 29 includes a camera 30 together with a number of openings or individual speakers 28 for audio emissions as well as a micro SD card 26 to record musical audio thereon and allow playback. The trackball 29 is powered by a preferred 6V battery 31. Both the SD card 26 and the 6 V battery are insertable into respective openings 27 and 32 in the trackball 29.

The trackball 29 is preferably mounted as illustrated in FIG. 13 using a multidirectional trackball mount 33 which is in turn attached to a flexible wrap 34 with a first portion of hook and loop fastener 35 engageable with a second portion of a hook and loop fastener 36. Typically, the hook and loop fastener is Velcro® or similar.

It is particularly preferred that the drive for the rocker assembly (and any other electronic devices associated with the rocker assembly) be battery operated in order to allow relatively free movement of the rocker assembly and associated devices without limitation as to finding a power source. Where provided in this form, the batteries can be rechargeable and/or replaceable.

According to the embodiment illustrated in FIG. 16, and OEM stroller or pram frame can be produced which incorporates the platform module support indicated in this drawing using reference 18. FIG. 16 shows a capsule 40 with canopy 10 and its attachment relative to the rocker module 11. The capsule 40 has a lifting arm 41 to which the wrap 34 can be attached. This wrap can also be attached to a portion of the handle of the pram or stroller frame which can be rotated about pivot 39 and extended or retracted using an alignable pin and slot arrangement 38.

A control panel 42 can be provide to control the various devices illustrated in FIG. 16 through control device 52 whose wiring connections are designated A1 to A4 in FIG. 16.

The communications pathways can alternatively be provided in a wireless configuration such that the trackball 29 can communicate with either a smartphone 55 or baby monitor 56. Use of a smartphone with appropriate controlling software could allow remote control actuation of any or all of the devices associated with the pram or stroller illustrated in FIG. 16 but particularly, the rocker assembly 50.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. A rocker assembly for settling a child, the assembly including
a base,
an upper platform including a pair of lateral sides attached to the base by a mounting assembly, the mounting assembly including a pair of linking arms positioned on each of said lateral sides of the upper platform for supporting the upper platform above the base, each of said linking arms pivotally attached to both the base and the upper platform to space the upper platform from the base and to limit the movement of the upper platform relative to the base, and
a connecting arm connected at a pivot point of one of the linking arms,
wherein the upper platform is connected to a rotating drive via the connecting arm and the connecting arm is attached circumferentially relative to the rotating drive such that rotation of the rotating drive is translated into an at least partially reciprocating movement of the upper platform with an element of one or more of pitch, roll or yaw to mimic the gait of a person.

2. The rocker assembly as claimed in claim 1 including a control device for activating, deactivating and controlling movement of the upper platform including duration of movement.

3. The rocker assembly as claimed in claim 1 including a control device to adjust the movement of the upper platform either in speed or direction or both.

4. The rocker assembly as claimed in claim 1 wherein said base is fixed in, or relative to, a housing in order to provide a fixed reference relative to which the upper platform is moved.

5. The rocker assembly as claimed in claim 1 wherein said rotating drive is provided in association with said base and includes a DC electric motor with a rotating output.

6. The rocker assembly as claimed in claim 1 wherein said base of the rocker assembly is hollow with at least a portion of an upper side being substantially planar.

7. The rocker assembly as claimed in claim 1 wherein said upper platform mounts a child support portion.

8. The rocker assembly as claimed in claim 7 wherein said upper platform is provided with one or more attachment or engagement mechanisms in order to attach or engage the child support portion relative thereto in order to prevent any relative movement between the upper platform and the child support portion.

9. The rocker assembly as claimed in claim 1 wherein said connecting arm is attached at a connection of one of the at least one linking arms to the upper platform.

10. A perambulator or stroller including the rocker assembly as claimed in claim 1.

11. A rocker module including the rocker assembly as claimed in claim 1.

12. The rocker module as claimed in claim 11 wherein the rocker assembly is located within a housing with a child support portion into which the child is placed associated with the housing.

13. The rocker module as claimed in claim 12 wherein said housing includes a control device in order to control the movement of the rocker assembly including activation and deactivation and also control of any other devices that require control that are associated with the rocker module.

14. A rocker system including the rocker module as claimed in claim 11 and a platform module support adapted for use on or in relation to a support surface, to allow easy attachment and detachment of the rocker module thereto.

15. The rocker system as claimed in claim 14 wherein the platform module support includes a substantially planar support surface on one side of a base including a pair of engagement portions, one being a fixed engagement portion and the other being a movable engagement portion.

16. A rocker assembly for settling a child, the rocker assembly including
a base,
an upper platform attached to the base by a mounting assembly, the mounting assembly including a pair of linking arms positioned on each of said lateral sides of the upper platform for supporting the upper platform above the base, each of said linking arms pivotally attached to both the base and the upper platform to space the upper platform from the base and to limit the movement of the upper platform relative to the base, and
a connecting arm connected at a pivot point of one of the linking arms,
wherein the upper platform is connected to a drive via the connecting arm and the connecting arm is attached relative to the drive such that the upper platform is reciprocally movable, with an element of one or more of pitch, roll or yaw, by the drive in a manner which mimics a movement of a parent of the child.

17. The rocker assembly as claimed in claim 16 wherein the rocker assembly can be controlled by remote control or other similar remote activation and deactivation.

18. The rocker assembly as claimed in claim 16 wherein the drive for the rocker assembly is battery operated with one or more batteries.

19. The rocker assembly as claimed in claim 18 wherein the one or more batteries are rechargeable and/or replaceable.

* * * * *